C. G. HAMILTON.
INDICATOR FOR VEHICLES.
APPLICATION FILED OCT. 23, 1916.
1,292,765.
Patented Jan. 28, 1919.
2 SHEETS—SHEET 2.
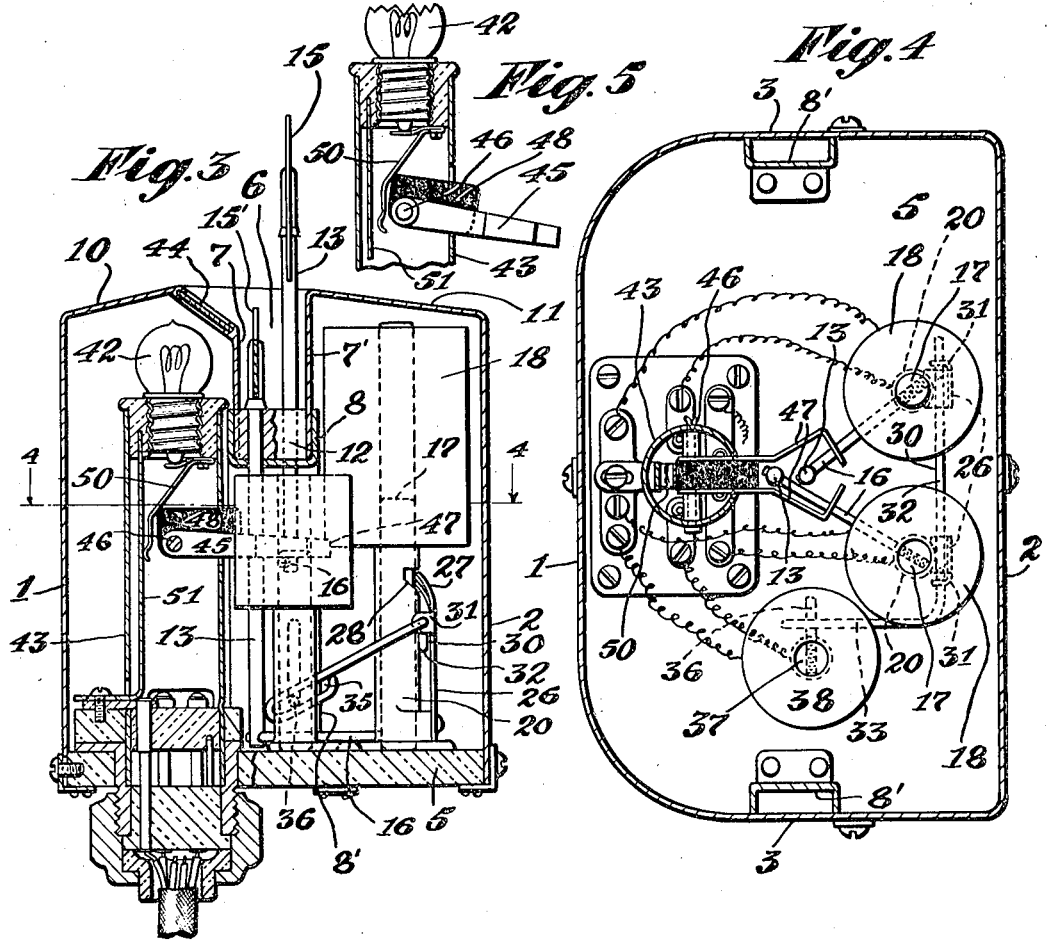
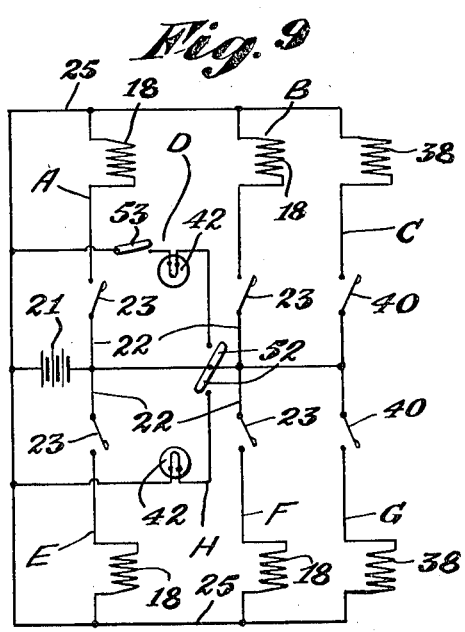
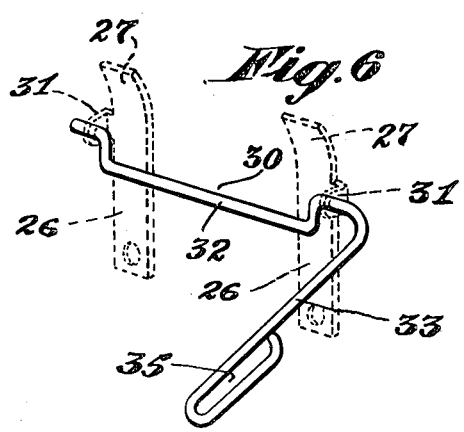
Inventor
Cameron G. Hamilton.
By Pierre Barnes
Attorney.

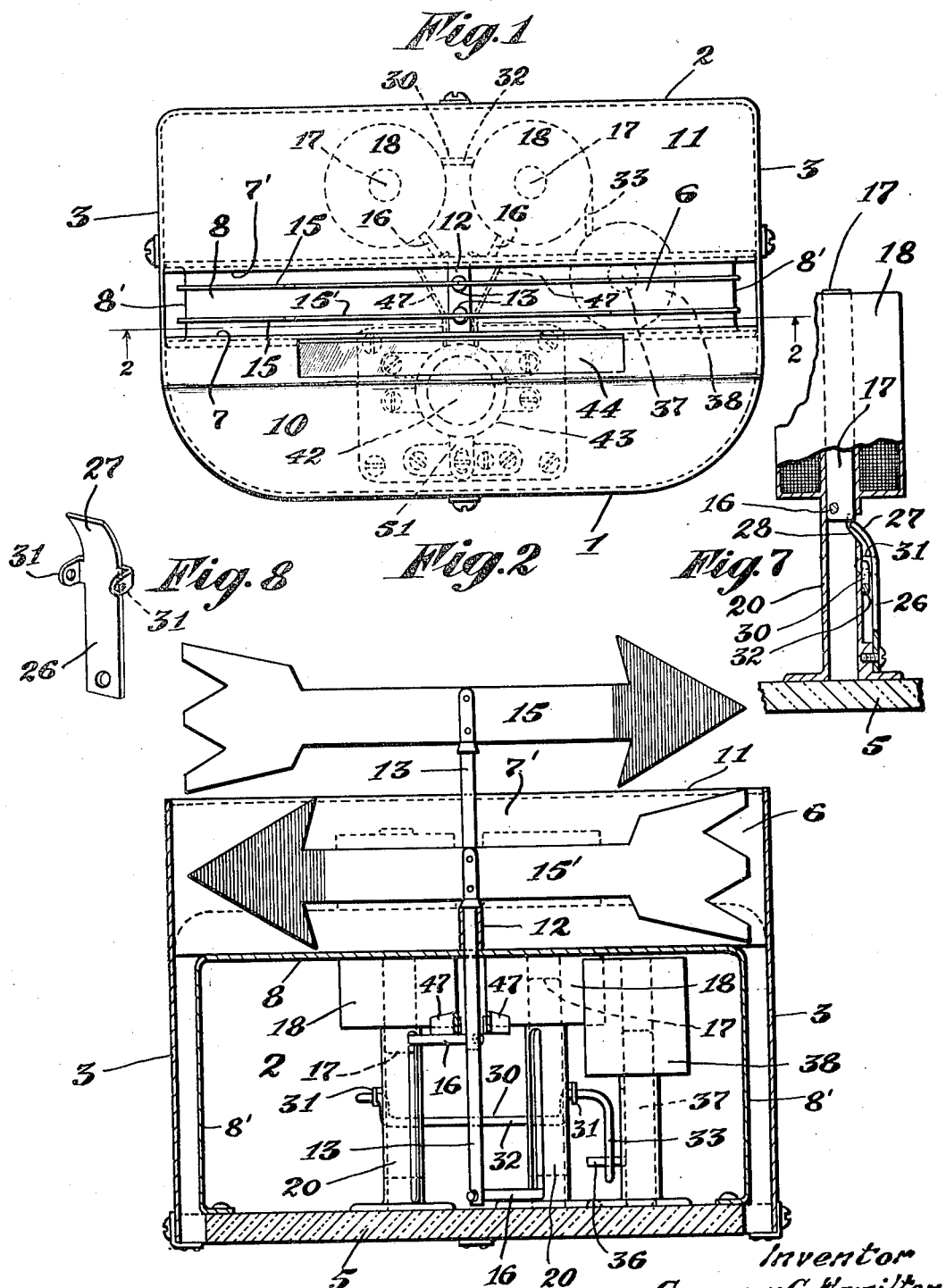

UNITED STATES PATENT OFFICE.

CAMERON G. HAMILTON, OF SEATTLE, WASHINGTON, ASSIGNOR OF ONE-HALF TO CULLEN K. STURTEVANT, OF SEATTLE, WASHINGTON.

INDICATOR FOR VEHICLES.

1,292,765.  Specification of Letters Patent.  Patented Jan. 28, 1919.

Application filed October 23, 1916. Serial No. 127,069.

*To all whom it may concern:*

Be it known that I, CAMERON G. HAMILTON, a citizen of the United States, residing at Seattle, in the county of King and State of Washington, have invented certain new and useful Improvements in Indicators for Vehicles, of which the following is a specification.

This invention relates to improvements in apparatus for indicating the direction of travel about to be taken by an automobile or other vehicle as well as to forewarn the public and especially drivers of vehicles in the rear that the signaling machine is about to stop or reverse its motion.

The object of the invention is to provide a simple, inexpensive and efficient indicator by which various signals may be given and which are operable by the driver through simply the closing of an electric button-switch and which can be used with equally desirable results in the daytime and in the night time.

The invention consists in the novel construction, adaptation and combination of parts of a direction indicator for vehicles, and the means of actuating the same, as will be fully described in the following specification, illustrated in the accompanying drawings, and finally set forth in the appended claims.

In said drawings, wherein reference characters indicate corresponding parts in the several views—

Figure 1 is a top plan view of a direction indicator embodying my invention.

Fig. 2 is a view in vertical longitudinal cross-section on line 2—2 of Fig. 1.

Fig. 3 is a vertical transverse cross-section of the same.

Fig. 4 is a horizontal sectional view on line 4—4 of Fig. 3.

Fig. 5 is a detached view of a detail shown in Fig. 3 illustrating a different position of the same.

Fig. 6 is a detached perspective view of an element of the invention.

Fig. 7 is a fragmentary view principally in vertical section of one of the solenoid members of the invention and connected parts thereof.

Fig. 8 is a detached perspective view of the locking member utilized in the invention.

Fig. 9 is a diagram of the electric wiring employed in the invention.

Referring to said views, the reference characters 1 and 2 indicate the front and rear walls of a box or casing, and 3 the side walls thereof. Said casing is desirably formed of sheet metal and is provided with a pressed fiber or other suitable bottom 5. The top wall of said casing is provided with an intermediate longitudinally arranged recess 6 formed by extending portions 7 and $7^1$ of the casing material vertically downward and securing them, as by soldering, to a channeled strip 8. Said strip is extended downwardly, as at $8^1$, upon the inside of said side walls 3 to carry away any water that may enter the recess 6.

Said top wall is sloped away from said recess at each side thereof, as at 10 and 11, to drain the most of any rain-water striking the top of the casing away from said recess, but the construction of the parts surrounding said recess will sufficiently carry away all moisture entering the recess and prevent the same entering the interior compartment of the casing.

12 indicates a block rigidly mounted transversely of said recess 8 provided with vertically arranged apertures for the slidable reception of upright spindles 13 upon the upper protruding end of which signals 15, $15^1$ are mounted. Said signals are normally retained within said recess 8 and are entirely below the plane of the casing top and thus hidden from view until raised by the means now described.

The lower ends of said spindles 13 are provided with radially directed rods 16 which are rigidly connected to the lower ends of solenoid armatures 17. Solenoid coils 18 are rigidly mounted upon tubular posts 20 within which the armatures 17 are reciprocatively mounted.

When said solenoids are selectively energized, the respective armature is elevated and through the connections constituted by the rod 16, raises the respective signals 15 or $15^1$ and denotes the direction in which the vehicle is about to turn. Said solenoids are energized through normally open electric circuits A and B, respectively, each consisting of the battery 21 (see Fig. 9), the conducting wire 22 connecting with one pole of the solenoid having the normally open push-button switch 23 therein, and the return common wire 25 connecting with the opposite side of battery 21.

The switch 23 is only momentarily closed to energize said solenoid magnet and to save current it is arranged to have the switch open at once upon the release of the operator's finger from the push-button. To retain the signal in elevated position, a spring-detent 26, see Fig. 8, is employed which is fixedly secured at its lower end and has a curved bill 27 at its upper end which yieldingly retains itself within a notch 28 in the posts 20. When the armature 17 is elevated beyond the notch 28, the bill-end 27 protrudes therebeneath and holds the armature and the connected signal in its elevated position until the same is released. Such release is effected through the employment of a crank 30 which is mounted in ears 31 in said detents 26, and has an arm 32 interposed between said detent and the posts 20. Another arm 33 is provided with an elongated slot 35 in which a pin 36 of an armature 37 is operatively mounted in a solenoid 38 similar to those already described.

When electric push-button switch 40 of electric circuit C (see diagram, Fig. 9), is closed, the solenoid 38 is energized to raise armature 37 which, in turn, through pin 36, rocks the crank-arm 32 and pushes the detent away from the post 20 to release the armature 17 and allow the signal 15 or 15¹ to descend by its gravity.

42 indicates an incandescent electric lamp operatively mounted upon a tubular standard 43 and adjacent a transparent plate 44 through which light rays are directed upon the side of the signals 15, 15¹ which is observed by the public when said signals are in their elevated positions, as illustrated in Fig. 3. The electric circuit D for said lamp is provided with a switch which is closed only when said signals are elevated. Said switch consists in a lever 45 pivoted at 46 and having arms 47 positioned directly over the respective rods 16 so as to be engaged thereby when said rods are elevated.

A block 48 of fiber of other non-conducting material is rigidly secured to said lever 45 and arranged to engage a spring switch-closing element 50. As said rods are lifted in the elevation of one of the signals 15, 15¹, the lever 45 is actuated thereby from the position illustrated in Fig. 5 to substantially the position shown in Fig. 3, thus contacting the said element 50 with a terminal 51 in said circuit D, completing said circuit and energizing said lamp 42 through well-known connections incident to incandescent lamps.

Said switch is maintained in closed condition as long as the signal is raised and upon the descent of the same the resilient power of the spring-element 50 will force the lever 45 downwardly and permit of the opening of said switch.

It will be apparent that the apparatus described will be suitable for installation upon any desired position upon an automobile, but preferably upon the extreme forward and rear ends thereof. When installed upon the forward end of a vehicle, the apparatus will be substantially as illustrated and described herein, and the signals 15, 15¹ may be simply in the form of arrows, as illustrated, pointing respectively to the right and left although the words "Right" and "Left" may be inscribed thereon with good effect.

In the case of apparatus for mounting upon the rear of the car, in addition to the right and left direction signals, it may be desirable to include similarly operated signals having the insignia "Stop" and "Back" imprinted thereon as a warning to vehicles coming in the rear, and automatically actuated by switch-closing mechanism, not shown, associated with the brake-lever and reversing gear lever, respectively. Also such rear signal apparatus may be conveniently associated with a frame, not shown, for holding a sign bearing the license number of the vehicle and the lamp 42 would be arranged to have the light rays therefrom directed upon such sign. In the latter case the apparatus would be designed so that the lamp would not be extinguished upon the lowering of the signals into the recess 8, but would be controlled by a common switch operable from the driver's seat.

In the diagram constituting Fig. 9, I have illustrated the preferred manner of electric wiring employed with my invention. Said diagram is drawn to include the wiring of both the front and rear signaling apparatus so far as they are within the scope of the present application. The circuits A, B, C and D are related to the forward signaling apparatus, while the circuits E, F, G and H, respectively, represent similar circuits directed to the rear apparatus.

A switch 52 is shown that is common to both said light circuits D and H, while circuit H is unprovided with the switch marked 53 in the diagram and represented by the elements 50 and 51 in the forward apparatus for the reason that the rear light may be required to be maintained constantly after night time to shed light upon the license number, as described, and also to illuminate red bull's-eye lenses, as required by most traffic ordinances.

While I have illustrated and described a practical embodiment of my invention, it will be understood that changes may be made in the arrangement set forth, within the scope of the appended claims, without departing from the spirit of my invention.

Having described my invention, what I claim is—

1. In an indicator for vehicles, the combination of a casing formed with a recess upon its upper side, a plurality of signals received within said recess when in their inoperative position, vertically reciprocable spindles, each having one of said signals mounted thereon, a solenoid magnet operatively connected with each said spindle to elevate said spindle and the attached signal when said solenoid is energized, a spring-detent adapted to maintain said signal in elevated position, a crank-arm arranged to disengage said detent from its connection with said signal, and electrical means to actuate said crank.

2. In an indicator for vehicles, a casing provided with a recess upon its upper side, the bottom of said recess being formed of a channeled strip affording a conductor for water entering said recess.

3. In an indicator for vehicles, a casing provided with a recess upon its upper side, the bottom of said recess being formed of a channeled strip, said strip extending downwardly upon the inside of said casing to afford a conductor for water entering said recess.

4. A direction indicator comprising a casing adapted to receive signal operating mechanism provided with a recess on its upper side adapted to receive signals, the bottom of said recess being formed of a channel strip that is bent to extend downwardly on the inside of said casing to afford an outlet at the bottom of said casing for water entering said recess.

5. A direction indicator comprising a casing adapted to receive signal operating mechanism, said casing having a recess in its upper side adapted to receive signals, and water outlet means extending downwardly from each end of said recess through said casing.

6. A direction indicator comprising a casing having a recess in the top thereof, a vertically reciprocable signal shielded within said recess when in lowered inoperative position, a solenoid having its armature connected to said signal to bodily lift the latter, a spring detent adapted to engage under the solenoid armature to maintain said signal and armature in elevated position, a crank arm operatively connected to said detent, and another solenoid to actuate said crank arm to effect the release of said detent.

7. A direction indicator comprising a casing having a recess in the top thereof, vertically movable signals adapted to be shielded within said recess when in an inoperative position, solenoids for lifting said signals, spring detents for holding said signals in an elevated position, a crank arm connected with said spring detents, a lever on said crank arm, a solenoid connected by a slot and pin connection with said lever for actuating the crank arm to release said detent means and permit the lowering of said signals, and electric circuits for selectively energizing said solenoids.

8. A direction indicator comprising a casing having a rectangular recess in the top wall thereof, one corner portion of said recess being formed at an angle to the side thereof, a transparent section in said angularly disposed corner portion, vertically reciprocable signals adapted to be shielded within said recess when in an inoperative position, means for lifting said signals to render them visible, and means connected with said signal lifting devices for closing a circuit and lighting a lamp when said signals are lifted to cause light to pass through said transparent section and illuminate said signal.

9. A direction indicator comprising a casing having a rectangularly shaped recess in the top wall thereof, one corner of said recess being formed at an angle to the side thereof and having a translucent section to permit the passage of light, vertically reciprocable signals adapted to be shielded within said recess when in an inoperative position, solenoids for lifting said signals, a lamp within said casing and connected with an electric circuit, a switch in said circuit and a lever arm actuated by said solenoids when said signals are lifted to close said circuit whereby said lamp will be lighted and illuminate said signals the light passing through said translucent section.

10. A direction indicator comprising a casing, having a recess in the top thereof, spindles projecting downwardly into said casing, vertically movable signals mounted on said spindles, said signals adapted to be shielded within said recess when in an inoperative position, tubular posts having slots, solenoids mounted thereon, armatures movable within said posts and having arms that project outwardly through said slots and are rigidly connected with the lower ends of said spindles, and means for energizing said solenoids to lift said armatures, and display said signals.

11. A direction indicator comprising a casing, having a recess in the top thereof, spindles projecting downwardly into said casing, vertically movable signals mounted on said spindles, said signals adapted to be shielded within said recess when in an inoperative position, tubular posts having slots, solenoids mounted thereon, armatures movable within said posts and having arms that project outwardly through said slots and are rigidly connected with the lower ends of said spindles, means for energizing said solenoids to lift said solenoids and display said signals, detents engageable with said solenoids to hold the latter in a lifted position and a separate solenoid for moving said detents into inoperative position.

12. A direction indicator comprising a casing, having a recess in the top thereof, spindles projecting downwardly into said casing, vertically movable signals mounted on said spindles, said signals adapted to be shielded within said recess when in an inoperative position, tubular posts having slots, solenoids mounted thereon, armatures movable within said posts and having arms that project outwardly through said slots and are rigidly connected with the lower ends of said spindles, means for energizing said solenoids to move said armatures and lift said signals, spring detents adapted to project through the slots in said tubular posts and engage with said armatures to hold the same in an elevated position, a crank arm disposed between said spring detents and said tubular posts, a lever, and means comprising a solenoid connected by said lever with said crank arm for turning said crank arm to move said spring detents out of engagement with said armatures.

Signed at Seattle, Wash., this 29th day of September, 1916.

CAMERON G. HAMILTON.

Witness:
E. PETERSON.